United States Patent
Yoshioku (10) Patent No.: US 9,158,724 B2
(45) Date of Patent: Oct. 13, 2015

(54) IMAGE FORMING APPARATUS PERFORMING ARBITRATION OF ACCESS REQUESTS FROM AN IC CHIP TO A MEMORY

(71) Applicant: KYOCERA Document Solutions Inc.

(72) Inventor: Shinobu Yoshioku, Osaka (JP)

(73) Assignee: Kyocera Document Solutions Inc. (JP)

( * ) Notice: Subject to any disclaimer, the term of this patent is extended or adjusted under 35 U.S.C. 154(b) by 335 days.

(21) Appl. No.: 13/774,592

(22) Filed: Feb. 22, 2013

(65) Prior Publication Data

US 2013/0227191 A1    Aug. 29, 2013

(30) Foreign Application Priority Data

Feb. 29, 2012  (JP) ................. 2012-042621

(51) Int. Cl.
G06F 13/40    (2006.01)
G06F 13/16    (2006.01)

(52) U.S. Cl.
CPC ........ *G06F 13/4031* (2013.01); *G06F 13/1663* (2013.01)

(58) Field of Classification Search
CPC ............ G06F 13/1605; G06F 13/1652; G06F 13/1663; G06F 13/1673; G06F 13/18; G06F 13/4031; G06F 13/404
See application file for complete search history.

(56) References Cited

U.S. PATENT DOCUMENTS

| | | | |
|---|---|---|---|
| 2005/0254085 A1 | 11/2005 | Oshikiri et al. | |
| 2007/0094459 A1* | 4/2007 | Suzuki et al. | 711/156 |
| 2008/0288690 A1 | 11/2008 | Namba | |
| 2013/0019033 A1* | 1/2013 | Shima | 710/34 |

FOREIGN PATENT DOCUMENTS

| | | |
|---|---|---|
| JP | 2005-354658 | 12/2005 |
| JP | 2008-310798 | 12/2008 |

* cited by examiner

Primary Examiner — Glenn A Auve (57) ABSTRACT

An image forming apparatus according to the present disclosure includes: a first IC chip; a second IC chip connected to the first IC chip via a serial bus; and a memory that is either connected to or included in the first IC chip. The first IC chip includes: a first internal bus; a memory controller of the memory; a first processing circuit which outputs an access request to the memory; plural buffers corresponding to plural arbitration priority degrees of the first internal bus, and a request classifying circuit which identifies an arbitration priority degree of a requester of the access request received from the second IC chip and causes a buffer corresponding to the identified arbitration priority degree to buffer the access request. The first internal bus performs arbitration of access requests from the first processing circuit and the plural buffers in accordance with the arbitration priority degrees.

8 Claims, 5 Drawing Sheets

| MEMORY AREA | | PRIORITY |
|---|---|---|
| TOP ADDRESS | BOTTOM ADDRESS | |
| TOP ADDRESS OF MEMORY AREA 61 | BOTTOM ADDRESS OF MEMORY AREA 61 | HIGH |
| TOP ADDRESS OF MEMORY AREA 62 | BOTTOM ADDRESS OF MEMORY AREA 62 | MIDDLE |
| TOP ADDRESS OF MEMORY AREA 63 | BOTTOM ADDRESS OF MEMORY AREA 63 | MIDDLE |
| TOP ADDRESS OF MEMORY AREA 64 | BOTTOM ADDRESS OF MEMORY AREA 64 | LOW |
| TOP ADDRESS OF MEMORY AREA 65 | BOTTOM ADDRESS OF MEMORY AREA 65 | LOW |

FIG. 4
PRIOR ART

IMAGE FORMING APPARATUS PERFORMING ARBITRATION OF ACCESS REQUESTS FROM AN IC CHIP TO A MEMORY

CROSS-REFERENCE TO RELATED APPLICATIONS

This application relates to and claims priority rights from a Japanese Patent Application: No. 2012-042621, filed on Feb. 29, 2012, the entire disclosures of which are hereby incorporated by reference herein.

BACKGROUND

1. Field of the Invention

The present invention relates to image forming apparatuses.

2. Description of the Related Art

Recently, high speed serial buses are developed such as PCIe (Peripheral Component Interconnect Express), and some image forming apparatus are applied a system in which functions are distributed to plural IC (Integrated Circuit) chips which are connected via such a high speed interface.

Such a system which includes plural IC chips connected via a serial bus enables each of the IC chips to be extensible and versatile, and results in small design changes of the IC chips and low cost system development.

Figure 4:
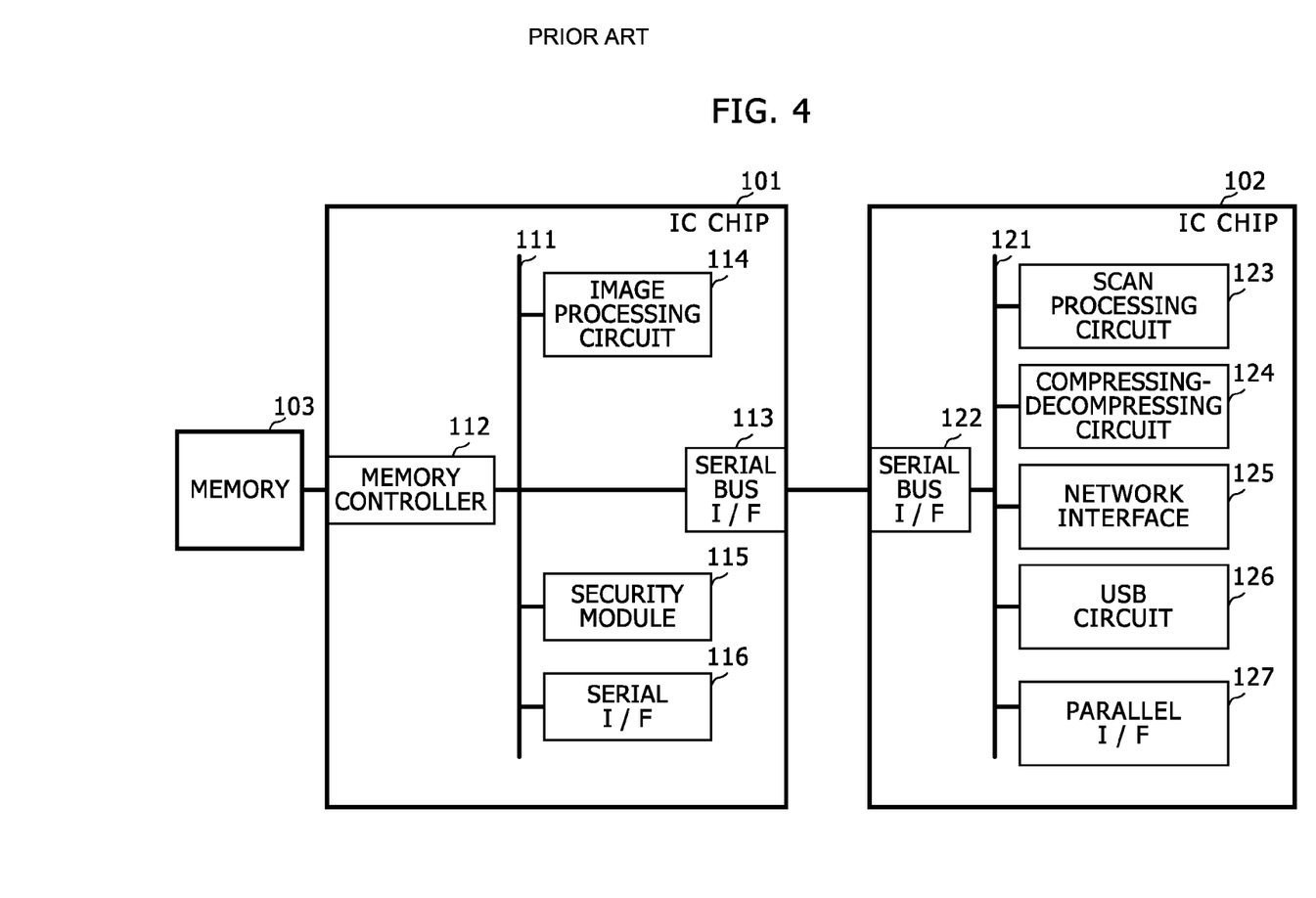
FIG. 4 shows a block diagram which indicates an example of an image forming apparatus which includes plural IC chips connected via a serial bus to each other.
Figure 5:
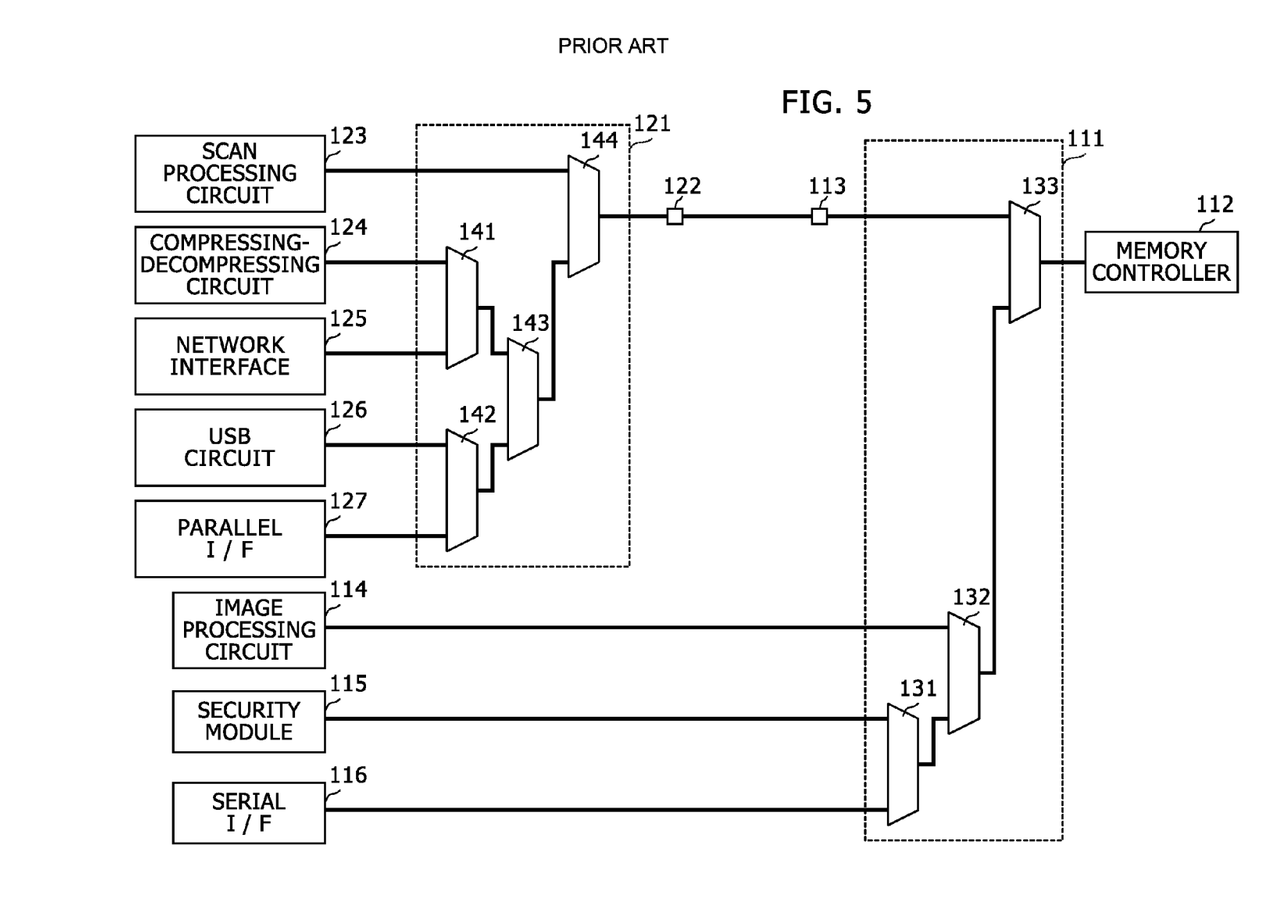
FIG. 5 shows a block diagram which indicates an example of arbitration priority setting for processing circuits on an internal bus in FIG. 4.

FIG. 4 shows a block diagram which indicates an example of an image forming apparatus which includes plural IC chips connected via a serial bus to each other. FIG. 5 shows a block diagram which indicates an example of arbitration priority degree setting for processing circuits on an internal bus in FIG. 4.

In the image forming apparatus shown in FIG. 4, an IC chip 101 and an IC chip 102 are connected via a serial bus to each other, and a memory 103 such as RAM (Random Access Memory) is connected to the IC chip 101.

In the IC chip 101, processing circuits are connected to an internal bus 111, such as a memory controller 112, a serial bus interface 113, an image processing circuit 114, a security module 115, and a serial interface 116.

On the other hand, in the IC chip 102, processing circuits are connected to an internal bus 121, such as a serial bus interface 122, a scan processing circuit 123, a compressing-decompressing circuit 124, a network interface 125, a USB circuit 126, and a parallel interface 127.

In the memory 103, a predetermined memory area is allocated for each of processing circuits such as the image processing circuit 114, the security module 115, and the serial interface 116, a scan processing circuit 123, a compressing-decompressing circuit 124, a network interface 125, a USB circuit 126, and a parallel interface 127. Each of the processing circuits performs data processing using the memory area allocated for itself as a buffer area or the like.

The internal buses 111 and 121 perform arbitration according to arbitration priority degrees of circuits connected to the internal buses 111 and 121. The arbitration priority degree is set as any of plural levels (here, three levels: high, middle, and low).

Among these processing circuits, since real time processing is required for copy job and so forth, arbitration priority degrees of the image processing circuit 114 and the scan processing circuit 123 are set as "high". Arbitration priority degrees of the serial interface 116, the USB circuit 126, and the parallel interface 127 are set as "low" due to their relatively low speed operation. Arbitration priority degrees of the other processing circuits (the compressing-decompressing circuit 124, the network interface 125, and the security module 115) are set as "middle".

As shown in FIG. 5, in the respective internal buses 111 and 121 in the IC chips 101 and 102, on the basis of these arbitration priority degrees, unshown arbiters run multiplexers 131 to 133 and 141 to 144. Specifically, in the internal bus 121 of the IC chip 102, the multiplexers 141 to 144 perform arbitration for the processing circuits in the IC chip 102 (i.e. the scan processing circuit 123 to the parallel interface 127), and an access request (either read request or write request) from the processing circuit selected by the arbitration to the memory 103 is transferred to the IC chip 101.

In the internal bus 111 of the IC chip 101, the multiplexers 131 to 133 perform arbitration for the processing circuits in the IC chip 101 (i.e. the serial bus interface 113 to the serial interface 116), and an access request from the processing circuit selected by the arbitration to the memory 103 is provided to the memory controller 112, which performs a memory access (either read or write) specified by the access request.

In the aforementioned system configuration, since the arbitration priority degree of the serial bus interface 113 is set as a constant level (i.e. any of "high", "middle", and "low") in the internal bus 111 of the IC chip 101 to which the memory 103 is connected, arbitration priority degrees in the internal bus 111 of the IC chip 101 can not be set as respective individual levels for the processing circuits in the IC chip 102 (i.e. scan processing circuit 123 to the parallel interface 127).

Therefore, in the aforementioned system configuration, an access request from the processing circuits in the IC chip 102 (i.e. scan processing circuit 123 to the parallel interface 127) to the memory 103 may be not processed adequately according to the original arbitration priority degrees.

If the IC chip 101 and the IC chip 102 are connected via plural channels such as virtual channels of PCIe and the plural channels are assigned to plural arbitration priority degrees, this problem would be solved. However, in this case, the plural channels such as the virtual channels must be available in both of the IC chips 101 and 102, and therefore, large scale circuits would be required for both of the IC chips 101 and 102 (especially, for the serial bus interfaces 113 and 122) and would result in a higher cost of the apparatus.

SUMMARY

An image forming apparatus according to an aspect of the present disclosure includes: a first IC chip; a second IC chip connected to the first IC chip via a serial bus; and a memory that is either connected to or included in the first IC chip. The first IC chip includes: a first internal bus; a memory controller connected to the first internal bus and configured to access the memory; one or more first processing circuits connected to the first internal bus and configured to output an access request to the memory; a first serial bus interface of the serial bus; plural buffers connected to the first internal bus; and a request classifying circuit. The plural buffers are configured to correspond to plural arbitration priority degrees of the first internal bus. The request classifying circuit is configured to (a1) identify an arbitration priority degree of a requester of the access request received from the second IC chip by the first serial bus interface, (a2) cause a buffer corresponding to the identified arbitration priority degree among the plural buffers to buffer the access request. The first internal bus is configured to (b1) perform arbitration of access requests to the memory from the one or more first processing circuits and the plural buffers in accordance with arbitration priority degrees of the one or more first processing circuit and the plural buffers, and (b2) output the access requests after the arbitration.

These and other objects, features and advantages of the present invention will become more apparent upon reading of the following detailed description along with the accompanied drawings.

DETAILED DESCRIPTION

Hereinafter, an embodiment according to an aspect of the present disclosure will be explained with reference to drawings.

Figure 1:
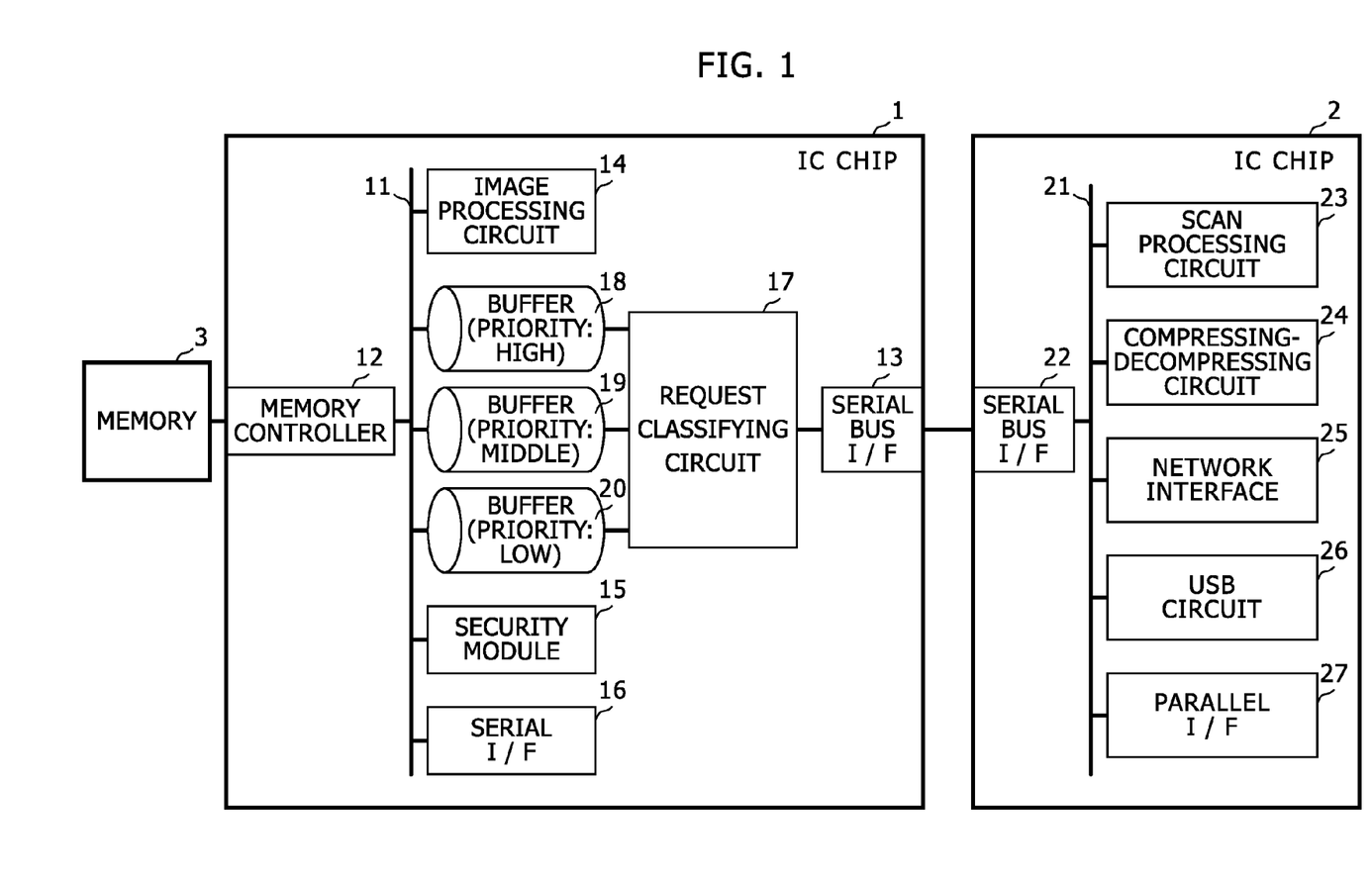
FIG. 1 shows a block diagram which indicates a configuration of an image forming apparatus according to an embodiment of the present disclosure.
Figure 2:
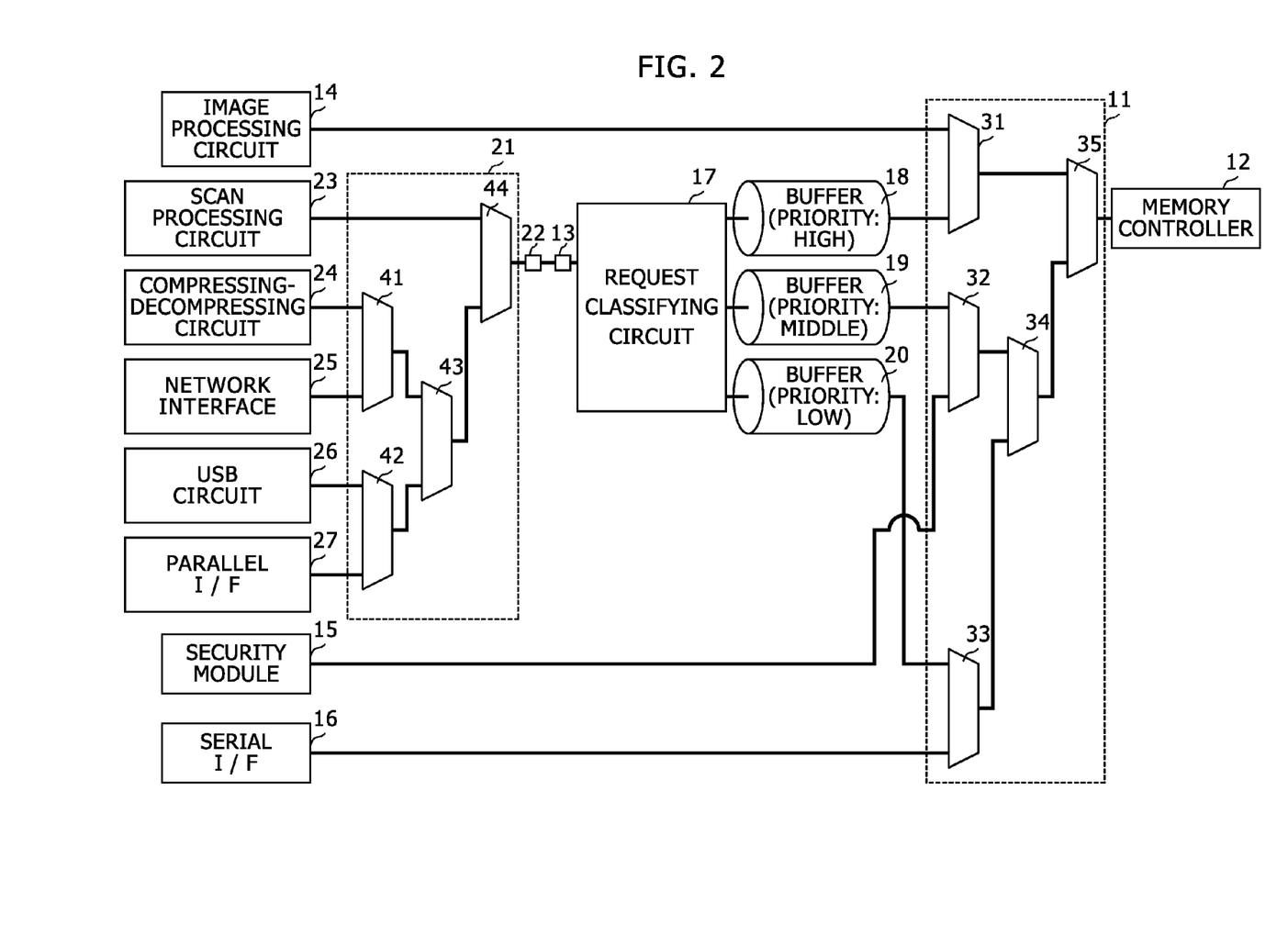
FIG. 2 shows a block diagram which indicates an example of arbitration priority setting for processing circuits on an internal bus in the image forming apparatus shown in FIG. 1.

FIG. 1 shows a block diagram which indicates a configuration of an image forming apparatus according to an embodiment of the present disclosure. FIG. 2 shows a block diagram which indicates an example of arbitration priority setting for processing circuits on an internal bus in the image forming apparatus shown in FIG. 1.

In the image forming apparatus shown in FIG. 1, an IC chip 1 and an IC chip 2 are connected via a serial bus to each other, and a memory 3 such as RAM is connected to the IC chip 1. For instance, the IC chips 1 and 2 are respective ASICs (Application Specific ICs), and connected via a single channel PCIe.

The IC chips 1 and 2 include internal buses 11 and 21 respectively. The internal buses 11 and 21 perform arbitration according to arbitration priority degrees of circuits connected to the internal buses 11 and 21. The arbitration priority degree is set as any of plural levels (here, three levels: high, middle, and low).

In the IC chips 1, a memory controller 12 for the memory 3 is connected to the internal bus 11. Further, the IC chips 1 includes a serial bus interface 13 of a serial bus connected to the IC chip 2. Furthermore, in the IC chips 1, other processing circuits are connected to the internal bus 11, such as an image processing circuit 14, a security module 15, and a serial interface 16. The memory controller is a slave block; and the image processing circuit 14, the security module 15, and the serial interface 16 are master blocks for the memory controller 12.

A request classifying circuit 17 is connected to the serial bus interface 13. Plural buffers 18 to 20 corresponding to plural arbitration priority degrees (here, of three levels: high, middle, and low) are connected to the request classifying circuit 17. These buffers 18 to 20 are also connected to the internal bus 11.

The image processing circuit 14 uses a memory area allocated for the image processing circuit 14 in the memory and performs image processing such as resolution conversion and color conversion required to generate print image data.

The security module 15 is a circuit which generates an encryption key used in encryption and decryption of image data using a memory area allocated for the security module 15 in the memory 3. The encrypted image data is stored, for example, in an unshown data storage device (e.g. hard disk drive or SSD (Solid State Drive)).

The serial interface 16 is a circuit which performs data communication of a serial interface standard such as RS-232C using a memory area allocated for the serial interface 16 in the memory 3.

The request classifying circuit 17 (a1) identifies an arbitration priority degree of a requester of an access request received from the IC chip 2 by the serial bus interface 13, and (a2) causes a buffer corresponding to the identified arbitration priority degree among the plural buffers 18 to 20 to buffer the access request.

The buffer 18 is a buffer corresponding to the arbitration priority degree "high" which is connected to the internal bus 11, and buffers an access request provided from the request classifying circuit 17 and outputs it to the internal bus 11 in the FIFO (First-In First-Out) order.

The buffer 19 is a buffer corresponding to the arbitration priority degree "middle" which is connected to the internal bus 11, and buffers an access request provided from the request classifying circuit 17 and outputs it to the internal bus 11 in the FIFO (First-In First-Out) order.

The buffer 20 is a buffer corresponding to the arbitration priority degree "low" which is connected to the internal bus 11, and buffers an access request provided from the request classifying circuit 17 and outputs it to the internal bus 11 in the FIFO (First-In First-Out) order.

The internal bus 11 (b1) performs arbitration of access requests to the memory 3 from the image processing circuit 14, the security module 15, the serial interface 16, and the buffers 18 to 20 in accordance with arbitration priority degrees of them, and (b2) outputs the access requests after the arbitration to the memory controller 12.

On the other hand, in the IC chip 2, processing circuits are connected to the internal bus 21, such as a serial bus interface 22, a scan processing circuit 23, a compressing-decompressing circuit 24, a network interface 25, a USB circuit 26, and a parallel interface 27. The scan processing circuit 23, the compressing-decompressing circuit 24, the network interface 25, the USB circuit 26, and the parallel interface 27 are master blocks for the memory controller 12. Therefore, the master blocks for the memory controller 12 are distributed in the IC chip 1 and the IC chip 2.

A serial bus interface 22 is a serial bus interface of the serial bus connected to the IC chip 1. In this embodiment, this serial bus is a serial bus based on PCIe; and one of the serial bus interfaces 13 and 22 is a root complex and the other is an end point.

The scan processing circuit 23 is a circuit which performs image scanning of a document image controlling an unshown image scanning mechanism (i.e. light emitting element, photo detecting element, scanning drive system, and so forth) and generates image data of the document image, using a memory area allocated for the scan processing circuit 23 in the memory 3. For example, the scan processing circuit 23 writes the generated image data into the memory area.

The compressing-decompressing circuit 24 is a circuit which performs compression and decompression of the image data using a memory area allocated for the compressing-decompressing circuit 24 in the memory 3. For example, the compressing-decompressing circuit 24 reads out the image data from the memory area and write the compressed image data into the memory area.

The network interface 25 is a circuit which performs data communication via a LAN (Local Area Network) using a memory area allocated for the network interface 25 in the memory 3.

The USB circuit 26 is a circuit which performs data communication with another device connected via a USB cable using a memory area allocated for the USB circuit 26 in the memory 3.

The parallel interface 27 is a circuit which performs data communication of a parallel interface standard such as IEEE 1284 using a memory area allocated for the parallel interface 27 in the memory 3.

The internal bus 21 performs arbitration of access requests to the memory 3 from the scan processing circuit 23, the compressing-decompressing circuit 24, the network interface 25, the USB circuit 26, and the parallel interface 27 in accordance with arbitration priority degrees of them, and outputs the access requests after the arbitration to the serial bus interface 22. The serial bus interface 22 transfers the access requests to the serial bus interface 13 of the IC chip 1 via the serial bus.

Among the processing circuits in the IC chips 1 and 2, since real time processing is required for copy job and so forth, arbitration priority degrees of the image processing circuit 14 and the scan processing circuit 23 are set as "high". Arbitration priority degrees of the serial interface 16, the USB circuit 26, and the parallel interface 27 are set as "low" due to their relatively low speed operation. Arbitration priority degrees of the other processing circuits (the compressing-decompressing circuit 24, the network interface 25, and the security module 15) are set as "middle".

Therefore, the processing circuits in the IC chip 2 (i.e. the scan processing circuit 23 to the parallel interface 27) include plural processing circuits with different arbitration priority degrees from each other. At least one of the processing circuits in the IC chip 2 (i.e. the scan processing circuit 23 to the parallel interface 27) has a higher arbitration priority degree than that of any of the processing circuit in the IC chip 1 (i.e. the image processing circuit 14, the security module 15, and the serial interface 16), and at least another one of the processing circuits in the IC chip 2 has a lower arbitration priority degree than that of any of the processing circuit in the IC chip 1.

As shown in FIG. 2, in the respective internal buses 11 and 21 in the IC chips 1 and 2, on the basis of these arbitration priority degrees, unshown arbiters run multiplexers 31 to 35 and 41 to 44. Specifically, in the internal bus 21 of the IC chip 2, the multiplexers 41 to 44 perform arbitration for the processing circuits in the IC chip 2 (i.e. the scan processing circuit 23 to the parallel interface 27), and an access request (either read request or write request) from the processing circuit selected by the arbitration to the memory 3 is transferred to the IC chip 1.

In this embodiment, according to the arbitration priority degrees of the processing circuits in the IC chip 2, the compressing-decompressing circuit 24 and the network interface 25 are arbitrated equally at the multiplexer 41, the USB circuit 26 and the parallel interface 27 are arbitrated equally at the multiplexer 42, and at the multiplexer 43, the multiplexers 41 and 42 are arbitrated under the condition that the priority of the multiplexer 41 is higher than the priority of the multiplexer 42.

In the internal bus 11 of the IC chip 1, the multiplexers 31 to 35 perform arbitration for the processing circuits (i.e. the image processing circuit 14, the security module 15, and the serial interface 16) and the buffers 18 to 20 in the IC chip 1, and an access request from either the processing circuit or the buffer selected by the arbitration to the memory 3 is provided to the memory controller 12, which performs a memory access (either read or write) specified by the access request.

In this embodiment, according to the arbitration priority degrees of the processing circuits and the buffers 18 to 20 in the IC chip 1, at the multiplexers 31 to 33 as the first stage, the image processing circuit 14 and the buffer 18, with the arbitration priority degree "high", are arbitrated equally at the multiplexer 31; the security module 15 and the buffer 19, with the arbitration priority degree "middle", are arbitrated equally; and the serial interface 16 and the buffer 20, with the arbitration priority degree "low", are arbitrated equally. At the multiplexer 34 as the next stage, the multiplexers 32 and 33 are arbitrated under the condition that the priority of the multiplexer 32 is higher than the priority of the multiplexer 33; and at the multiplexer 35, the multiplexers 31 and 34 are arbitrated under the condition that the priority of the multiplexer 31 is higher than the priority of the multiplexer 34.

As mentioned, in the internal bus 11, at the first stage, the multiplexers 31 to 33 arbitrate a processing circuit among the processing circuits (the image processing circuit 14, the security module 15, and the serial interface 16) and a buffer having the same arbitration priority degree as that of the processing circuit among the buffers 18 to 20.

In the following part, explained is classification of the access requests by the request classifying circuit 17.

Figure 3A:
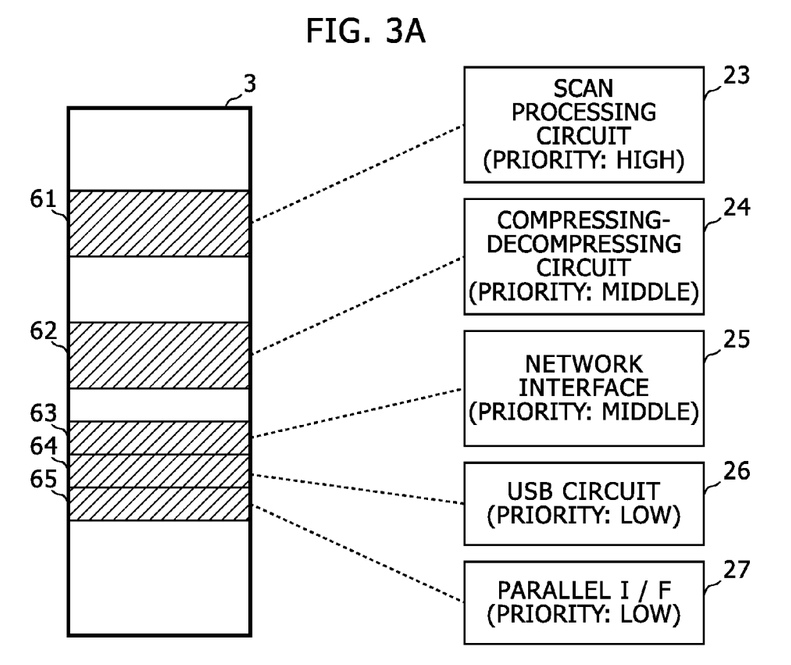
FIG. 3A and FIG. 3B show diagrams which indicate an example of a relationship between processing circuits in an IC chip 2 in FIGS. 1 and 2 and memory areas in a memory, and an example of a relationship between the memory area and an arbitration priority degree on the basis of the relationship between the processing circuits in the IC chip 2 and the memory areas.
Figure 3B:
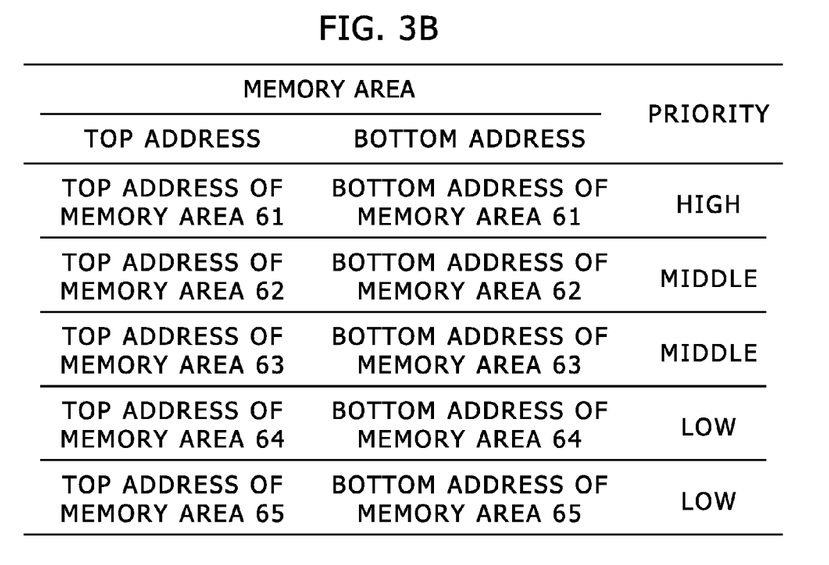

FIG. 3A and FIG. 3B show diagrams which indicate an example of a relationship between processing circuits in the IC chip 2 in FIGS. 1 and 2 and memory areas in the memory 3, and an example of a relationship between the memory area and an arbitration priority degree on the basis of the relationship between the processing circuits in the IC chip 2 and the memory areas. FIG. 3A indicates an example of a relationship between processing circuits in an IC chip 2 and memory areas in the memory 3. FIG. 3B indicates an example of a relationship between the memory areas and arbitration priority degrees on the basis of the relationship.

The memory 3 includes plural memory areas which have been allocated for the respective processing circuits in the IC chips 1 and 2. FIG. 3A shows only plural memory areas 61 to 65 which have been allocated for the respective processing circuits in the IC chip 2.

The scan processing circuit 23 performs a scan process using the memory area 61. Therefore, the scan processing circuit 23 outputs an access request to the memory area 61.

The compressing-decompressing circuit 24 performs a compression process and a decompression process using the memory area 62. Therefore, the compressing-decompressing circuit 24 outputs an access request to the memory area 62.

The network interface 25 performs a communication process using the memory area 63. Therefore, the network interface 25 outputs an access request to the memory area 63.

The USB circuit 26 performs a communication process using the memory area 64. Therefore, the USB circuit 26 outputs an access request to the memory area 64.

The parallel interface 27 performs a communication process using the memory area 65. Therefore, the parallel interface 27 outputs an access request to the memory area 65.

The request classifying circuit 17 includes a table of arbitration priority degrees in association with the respective memory areas 61 to 65 as shown in FIG. 3B, and identifies the arbitration priority degree of a requester of an access request on the basis of the table by identifying the memory area to which an address specified by the access request belongs.

For example, the table shown in FIG. 3B is set to the request classifying circuit 17 in advance, which includes a relationship between the top and the bottom addresses of the memory area 61 to 65 and the respective arbitration priority degree of the processing circuit which access the memory area 61 to 65. Afterward, the request classifying circuit 17 (a) identifies the address to be accessed from an access request, (b) identifies a memory area which the identified address belongs to by determining whether the identified address belongs to a range from the top address to the bottom address of each memory area or not in turn, and (c) identifies the arbitration priority degree corresponding to the identified memory area.

In the following part, an operation of the image forming apparatus is explained.

In the IC chip 1, the image processing circuit 14, the security module 15, and the serial interface 16 run independently. In the IC chip 2, the scan processing circuit 23, the compressing-decompressing circuit 24, the network interface 25, the USB circuit 26 and the parallel interface 27 run independently.

These processing circuits output access requests to the memory 3 when necessary.

The internal bus 21 of the IC chip 2 performs arbitration on the basis of the arbitration priority degrees for an access request from the processing circuits in the IC chip 2, and outputs the access request to the serial bus interface 22 after the arbitration. The serial bus interface 22 transfers the access request to the IC chip 1.

In the IC chip 1, the serial bus interface 13 receives the access request and outputs it to the request classifying circuit 17 upon receiving it. The request classifying circuit 17 identifies the arbitration priority degree of the requester from the access request and inputs the access request into the buffer corresponding to the identified arbitration priority degree (i.e. any of the buffers 18 to 20).

In this embodiment, as shown in FIGS. 3A and 3B, the request classifying circuit 17 selects a buffer corresponding to an address specified by the access request, which the access request is inputted to.

Therefore, an access request from the scan processing circuit 23 is inputted to the buffer 18; an access request from either the compressing-decompressing circuit 24 or the network interface 25 is inputted to the buffer 19; and an access request from either the USB circuit 26 or the parallel interface 27 is inputted to the buffer 20.

The internal bus 11 of the IC chip 1 performs arbitration on the basis of the arbitration priority degrees for access requests from the processing circuits in the IC chip 1 and the buffers 18 to 20, and outputs the access requests to the memory controller 12 in turn. The memory controller 12 performs an access to the memory 3 in accordance with the inputted access request.

In the aforementioned embodiment, the IC chip 2 is connected via the serial bus to the IC chip 1 to which the memory 3 is connected. The IC chip 1 includes the request classifying circuit 17 and the plural buffers 18 to 20 connected to the internal bus 11. These buffers 18 to 20 correspond to the plural arbitration priority degrees (i.e. plural levels of the arbitration priority degree) on the internal bus 11. The request classifying circuit 17 identifies the arbitration priority degree of a requester of an access request to the memory 3 which is received from the IC chip 2 by the serial bus interface 13, and the access request is buffered in a buffer corresponding to the identified arbitration priority degree among the buffers 18 to 20. In accordance with the arbitration priority degrees of the processing circuits in the IC chip 1 and the buffers 18 to 20, the internal bus 11 performs arbitration of access requests to the memory 3 from the processing circuits in the IC chip 1 and the buffers 18 to 20, and outputs them to the memory controller 12.

Therefore, access requests to the memory 3 from the IC chip 2 are classified to the buffers 18 to 20 disposed in correspondence with respective arbitration priority degrees, and consequently, in the IC chip 1 connected to the memory 3, access requests from the processing circuits in the IC chip (namely, another IC chip connected via the serial bus to the IC chip 1) are processed properly in accordance with the original arbitration priority degrees (i.e. the arbitration priority degrees in the IC chip 2) of them.

The description of the present invention has been presented for purposes of illustration and description, and is not intended to be exhaustive or limited to the invention in the form disclosed.

For example, the memory 3 may be disposed inside the IC chip 1.

Further, in the aforementioned embodiment, in the case that a read access and a write access from one processing circuit inside the IC chip 2 are requested to different memory areas respectively, different relationship tables like that shown in FIG. 3B may have been set for the read access and the write access, and in reference to the table corresponding to the type (read or write) of an access request, the request classifying circuit 17 may select a buffer to which an access request (a read access request or a write access request) should be inputted. In this case, even if one processing circuit accesses different memory areas for a read access and a write access, the arbitration priority degree of the processing circuit is identified properly in the request classifying circuit 17.

Furthermore, in the aforementioned embodiment, different arbitration priority degrees may be set for respective write and read accesses of one processing circuit.

Furthermore, in the aforementioned embodiment, plural processing circuits in the IC chip 2 of which the respective arbitration priority degrees are identical may share a part or all of a memory area in the memory 3.

Furthermore, in the aforementioned embodiment, plural IC chips in cascade connection and/or parallel connection may be connected to the IC chip 1 via a serial bus such as PCIe as well as the IC chip 2. In such a case, in the IC chip 1, the arbitration is performed for an access request from a processing circuit in any of the plural IC chips as well as the arbitration for an access request from a processing circuit in the IC chip 2.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
   a first IC chip;
   a second IC chip connected to the first IC chip via a serial bus; and a memory that is either connected to or included in the first IC chip;

wherein the first IC chip comprises:

a first internal bus; said first internal bus having circuitry to perform arbitration of access requests to the memory;

a memory controller connected to the first internal bus and configured to access the memory;

one or more first processing circuits connected to the first internal bus and configured to output an access request to the memory;

a first serial bus interface of the serial bus;

plural buffers connected to the first internal bus and corresponding to plural arbitration priority degrees of the first internal bus, respectively; and a request classifying circuit configured to (a1) identify an arbitration priority degree of a requester of an access request to the memory received from the second IC chip by the first serial bus interface, and (a2) cause a buffer corresponding to the identified arbitration priority degree among the plural buffers to buffer the access request received from the second IC chip; and the first internal bus configured to (b1) perform arbitration of access requests to the memory from the one or more first processing circuits and the plural buffers in accordance with arbitration priority degrees of the one or more first processing circuit and the plural buffers, and (b2) output the access requests after the arbitration to the memory controller.

2. The image forming apparatus according to claim 1, wherein:

the second IC chip comprises:

a second internal bus;

plural second processing circuits connected to the second internal bus and configured to output an access request to the memory; and a second serial bus interface connected to the second internal bus and the serial bus, and configured to transfer the access request from the second processing circuits to the first IC chip via the serial bus; and the plural second processing circuits include plural processing circuits with different arbitration priority degrees from each other.

3. The image forming apparatus according to claim 2, wherein:

the memory comprises plural memory areas allocated for the plural second processing circuits respectively;

each second processing circuit is further configured to output the access request to the memory area corresponding to this second processing circuit; and the request classifying circuit includes information on the respective arbitration priority degrees in association with the plural memory areas, and is further configured to identify the arbitration priority degree of a requester of the access request on the basis of the information by identifying the memory area to which an address specified by the access request belongs.

4. The image forming apparatus according to claim 2, wherein:

one of the plural second processing circuits has a higher arbitration priority degree than that of any of the one or more first processing circuits; and another one of the plural second processing circuits has a lower arbitration priority degree than that of any of the one or more first processing circuits.

5. The image forming apparatus according to claim 2, wherein:

the one or more first processing circuits include an image processing circuit configured to generate print image data; and the plural second processing circuits include a scan processing circuit configured to perform image scan of a document image.

6. The image forming apparatus according to claim 1, wherein:

the first internal bus comprises a multiplexer configured to arbitrate any of the one or more first processing circuits and any of the plural buffers which has the same arbitration priority degree as that of the first processing circuit.

7. The image forming apparatus according to claim 1, wherein:

the serial bus is configured to transfer the access requests to the memory via a single channel.

8. The image forming apparatus according to claim 1, wherein:

the serial bus is a serial bus based on PCIe.

* * * * *